R. F. CHATILLON.
MEAT TENDERER.
APPLICATION FILED DEC. 3, 1914.
1,161,845.
Patented Nov. 30, 1915.
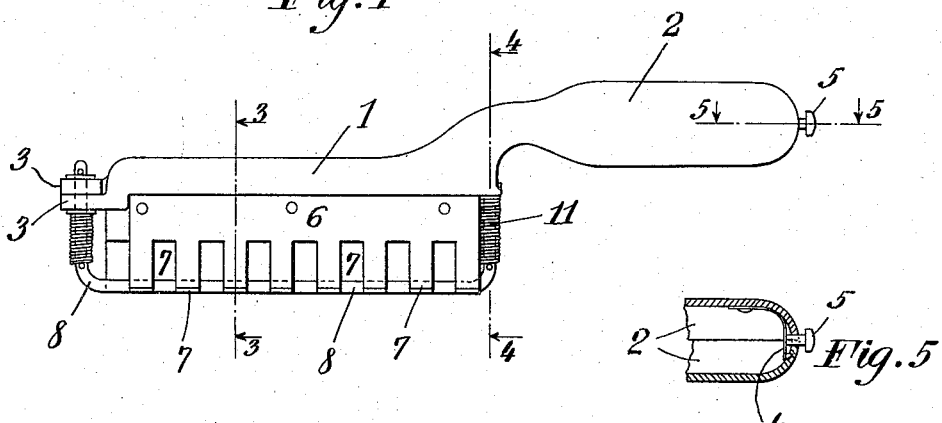
WITNESSES:
INVENTOR
Ralph F. Chatillon
Edwards, Sager & Wooster
ATTORNEYS

UNITED STATES PATENT OFFICE.

RALPH F. CHATILLON, OF GREENBURG, NEW YORK.

MEAT-TENDERER.

1,161,845. Specification of Letters Patent. Patented Nov. 30, 1915.

Application filed December 3, 1914. Serial No. 875,223.

*To all whom it may concern:*

Be it known that I, RALPH F. CHATILLON, a citizen of the United States, residing at Greenburg, in the county of Westchester and State of New York, have invented certain new and useful Improvements in Meat-Tenderers, of which the following is a full, clear, and exact specification.

This invention relates to meat tenderers, and has particular reference to improvements in the structure whereby not only can effective shredding of the meat be had, but also enabling the device to be more easily and completely cleaned after use.

According to the present invention, a device is provided which is separable into substantially two halves, these halves including between them the stripper, so that when closed the stripper is movable between the blades, but when opened the stripper and the blades are all separated so as to be easily cleaned.

In general, the invention comprises two halves pivoted at one end and separably latched at the other or handle end, together with a stripper preferably mounted on the same pivot, the whole forming a simple and comparatively cheap device to construct, and yet capable of being easily assembled and cleaned.

A preferred form is shown in the accompanying drawings, wherein—

Figure 1 is an elevation of the device complete, ready for use; Fig. 2 is a perspective showing the device opened, rendering the interior accessible for cleaning, and Figs. 3, 4 and 5 are details respectively on the lines 3—3, 4—4, and 5—5 of Fig. 1.

1—1 represents two castings, provided with hollow handle extensions 2, which are pivoted together at one end as by lugs 3, and having a latch 4 with an operating pin 5 at the other end. By pressing the pin 5 in, the latch 4 disengages from the notch and the entire device can be opened. To each of the sides 1, is attached a knife 6, consisting of a back and one or more attached blades 7, and these blades 7 preferably alternate as shown in Figs. 1, 2 and 3.

8 represents a stripper bar consisting of a U-shaped rod also constituting the pivot for the lugs 3 at one end and at its other end carrying a sliding washer 9, which is locked by slots 10 in the pivoted halves 1 when brought together.

11 are springs which yield when the knives are forced into the meat, and assist in withdrawing them by the expansion of the springs. When the knives are forced into the meat, the stripper bar is moved relatively upwardly at each end, thereby compressing the springs 11, so that their expansion will assist in withdrawing the knives from the meat.

When the device is to be cleaned, it will simply be necessary to release the latch, whereupon the entire device can be separated and the relatively few parts all become separated and easily accessible for cleaning.

The present invention offers several advantages over prior devices of this character, in simplicity, accessibility, and strength.

Obviously the specific construction herein described and shown can be varied without departing from the scope of the appended claims.

Having thus described my invention, what I declare as new and desire to secure by Letters Patent of the United States is:—

1. An implement of the class described comprising a pair of knives, one knife having a series of separated blade projections and the other knife hinged to said first knife at one end, and separably held thereto at the other end.

2. An implement of the class described comprising a pair of knives, one knife having a series of separated blade projections and the other knife hinged to said first knife at one end and separably held thereto at the other end, and a stripper mounted beween said knives.

3. An implement of the class described comprising a pair of knives hinged together at one end and separably connected at the other end, and a yielding stripper mounted between said knives.

4. In an implement of the class described, the combination with a knife having a series of separated blade projections and a handle section, of a second knife hinged to said first knife at one end and provided with a handle section coöperating with said first handle section.

5. An implement of the class described comprising a pair of knives hinged together at one end each knife comprising a series of separated blade projections, means for separably connecting said knives at the other end, and a handle separable with the knives.

6. An implement of the class described comprising a separable handle, a knife carrying separated blade projections attached to each handle section, a stripper connecting the knives at the end opposite the handle, and latching means.

7. An implement of the class described comprising a separable handle, a knife attached to each handle section, a stripper attached to both parts at one end and being locked at the other end when the knives and handle are brought together, and latching means.

8. An implement of the class described comprising a separable handle, a knife attached to each handle section, a stripper slidable relatively to the knives, said stripper at one end constituting a pivot for connecting the knives, and at the other end being slidably supported between the knives and handle when closed.

9. An implement of the class described comprising a separable handle, a knife attached to each handle section, a stripper slidable relatively to the knives, said stripper at one end constituting a pivot for connecting the knives, and at the other end being slidably supported between the knives and handle when closed and springs for normally positioning the stripper adjacent the knife edges.

In testimony whereof I affix my signature, in presence of two witnesses.

RALPH F. CHATILLON.

Witnesses:
J. S. WOOSTER,
M. STRICKLAND.

Copies of this patent may be obtained for five cents each, by addressing the "Commissioner of Patents, Washington, D. C."

It is hereby certified that in Letters Patent No. 1,161,845, granted November 30, 1915, upon the application of Ralph F. Chatillon, of Greenburg, New York, for an improvement in "Meat-Tenderers," an error appears in the printed specification requiring correction as follows: Page 2, claim 6, strike out line 4 and insert the words *to each handle member, means pivotally;* and that the said Letters Patent should be read with this correction therein that the same may conform to the record of the case in the Patent Office.

Signed and sealed this 11th day of January, A. D., 1916.

[SEAL.]

J. T. NEWTON,
*Acting Commissioner of Patents.*

Cl. 17—27.